A. L. McMURTRY.
SPEED REGULATOR FOR MOTOR VEHICLES.
APPLICATION FILED FEB. 4, 1916. RENEWED JAN. 27, 1919.
1,431,169.                                    Patented Oct. 10, 1922.
                                                     2 SHEETS—SHEET 1.
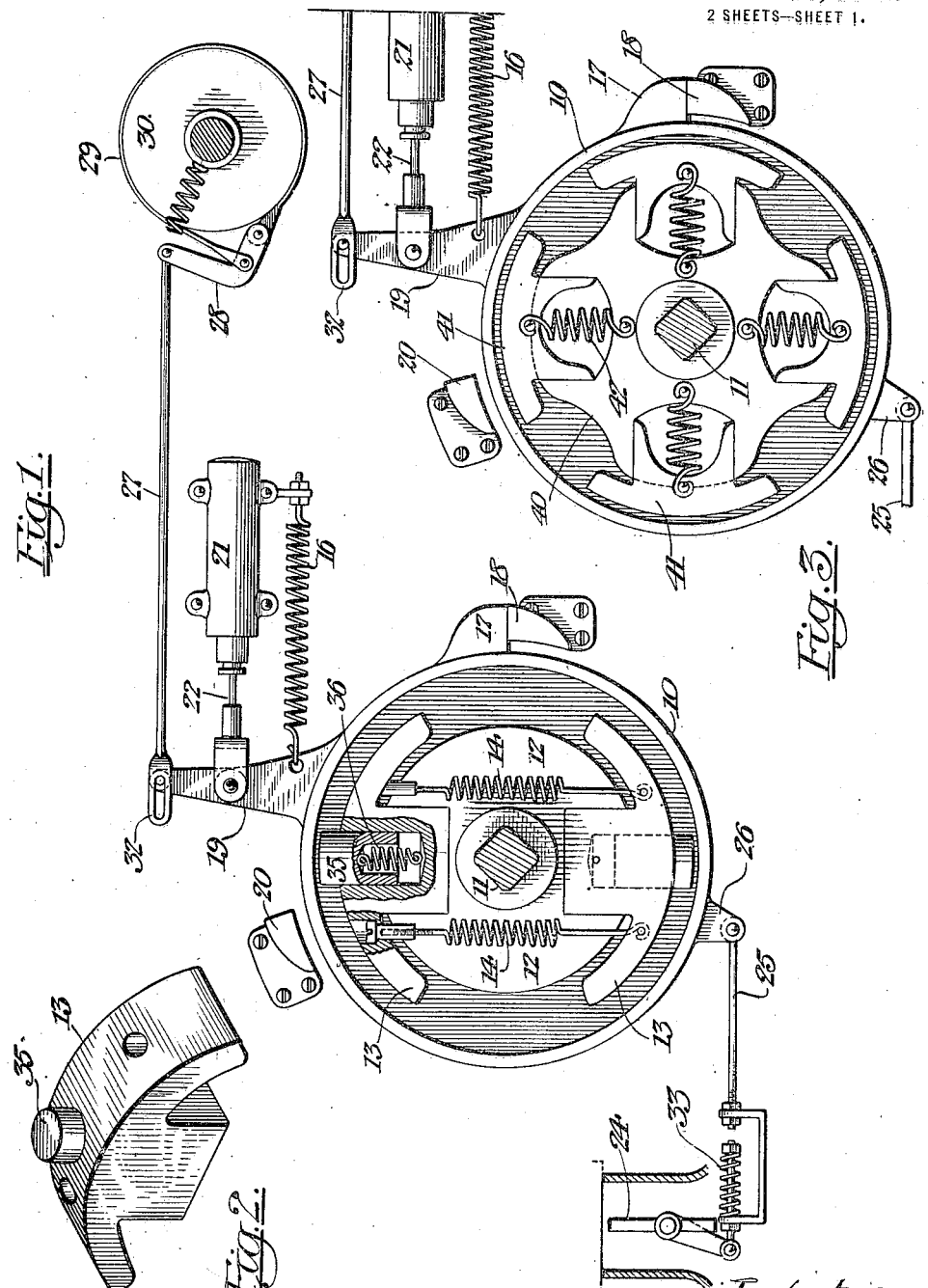
Inventor
Alden L. McMurtry.
by his Attorney A. L. McMURTRY.
SPEED REGULATOR FOR MOTOR VEHICLES.
APPLICATION FILED FEB. 4, 1916. RENEWED JAN. 27, 1919.
1,431,169.
Patented Oct. 10, 1922.
2 SHEETS—SHEET 2.
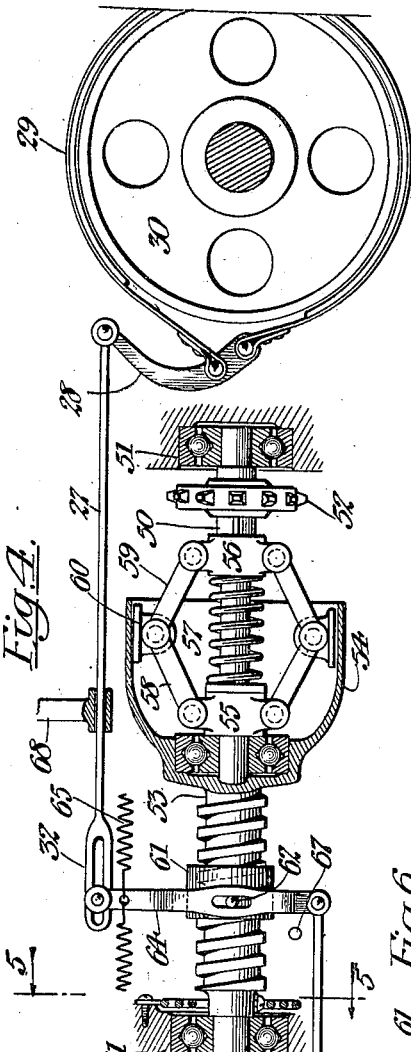
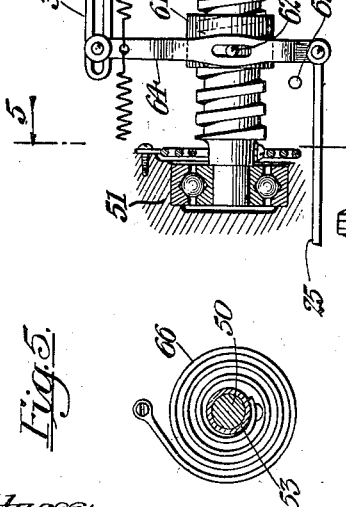
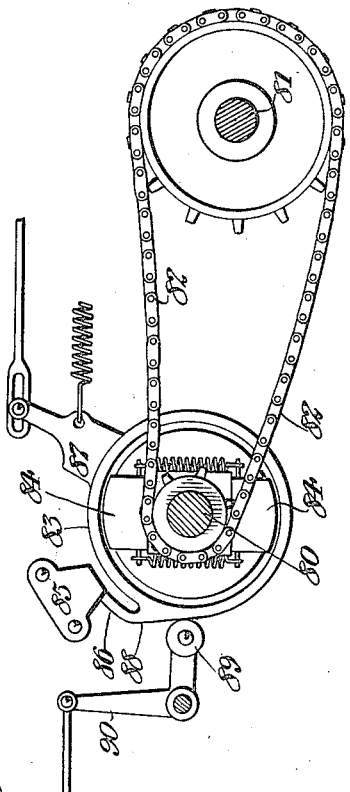
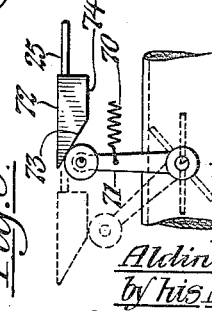
Inventor:
Aldin L. McMurtry.
by his Attorney.
Witness:

Patented Oct. 10, 1922.

1,431,169

UNITED STATES PATENT OFFICE.

ALDEN L. McMURTRY, OF WASHINGTON, DISTRICT OF COLUMBIA.

SPEED REGULATOR FOR MOTOR VEHICLES.

Application filed February 4, 1916, Serial No. 76,092. Renewed January 27, 1919. Serial No. 273,504.

*To all whom it may concern:*

Be it known that I, ALDEN L. McMURTRY, a citizen of the United States, and resident of Washington, D. C., have invented certain new and useful Improvements in Speed Regulators for Motor Vehicles, of which the following is a specification.

This invention relates to certain improvements in speed governors for motor vehicles, the main object of the invention being to positively prevent the vehicle from traveling faster than a predetermined speed under any and all conditions of load, grade and engine speed, and to positively prevent the driver from tampering with, or preventing, the proper operation of the controlling device.

Prior devices for controlling the speed of the vehicle by governing the speed of the engine, either from a driven part of the engine or from a driven part of the vehicle in the rear of the clutch and transmission gearing, while effective under certain conditions, will not operate to prevent the vehicle from racing down-hill, when the clutch is disengaged or the gear shift lever is at neutral.

In my improved construction, I secure a speed control operable at all times and acting to positively apply a braking action to the vehicle whenever it travels at an excessive speed, the operating part of the controller having its speed at a constant and predetermined ratio to that of the vehicle itself.

In order to prevent the waste of power, I may arrange the device to throttle the engine before applying the brakes, but I prefer to make the braking action powerful enough to effect the desired limiting of the vehicle speed even when the engine is not throttled, or when the vehicle is coasting down-hill with the engine disconnected either at the clutch or at the transmission gear. While the control of the engine speed is preferably by the throttle, it may be in various other ways.

My invention in its preferred embodiment involves various novel and important features. For the governing device, I may employ various types having weights or other members which move to operative position by centrifugal force only when a predetermined speed is reached, but when in operative position, will frictionally engage and tend to rotate a member operatively connected to either the throttle or the brakes, or to both. The range of movement of such frictionally driven member may be limited so that when the increase in speed and frictional driving tendency has moved it to a predetermined position, further movement will be prevented and the friction between the driving and the driven members will be relied upon to produce braking action. The frictionally driven member, during its limited movement, may operate to first control the throttle and then to apply the main brakes or other supplemental brakes which may act in addition to the braking action produced by the frictional resistance in the device itself.

Various embodiments of my invention may be designed within the scope of the appended claims and without departing from the spirit of my invention. In the accompanying drawings, to which reference is to be had, I have illustrated certain embodiments, but these are illustrative only, and I do not desire to be limited to the details of construction there shown.

In these drawings:

Figure 1 is a view partly in section showing one embodiment of my invention;

Figure 2 is a perspective view of one of the shoes employed in the construction shown in Figure 1;

Figure 3 is a view similar to a portion of Figure 1 but showing an alternative construction;

Figure 4 is a central longitudinal section of a form especially designed to be installed in a completed vehicle;

Figure 5 is a transverse section on the line 5—5 of Figure 4 and looking in the direction of the arrow;

Figure 6 is also a transverse section on the line 5—5 of Figure 4 but looking in the opposite direction;

Figure 7 is an end view of a further alternative form and

Figure 8 is a view of a modification of a throttle operator.

The construction illustrated in Figure 1 is particularly designed to be built into a vehicle during the construction of the latter, although it might be installed in an otherwise completed vehicle. The device includes a shell or casing 10 having an inner surface concentric with a shaft 11 and mounted for limited rotation in respect to the latter.

The shaft 11 may be and preferably is the main propeller shaft of the vehicle and the casing 10 may be installed closely adjacent to or within a part of the casing which encloses the transmission gearing and directly in front of the first universal joint. The shaft 11 thus is rotated at a speed directly proportional to the speed of the vehicle and its speed may vary in respect to the engine speed either by the shifting of the transmission gears or by the disengagement of the clutch. Secured to the shaft 11 is a head or collar 12 serving as a guide for radially movable shoes 13. The latter are normally drawn into the limiting position toward the axis of rotation by any suitable means such, for instance, as springs 14, the strength of which is sufficient to prevent the shoes from moving out into engagement with the casing 10 by the action of centrifugal force when the vehicle is traveling at any and all speeds below the predetermined speed to which it is desired to limit the vehicle. Thus, when the vehicle is traveling below the critical or predetermined speed, the parts within the casing 10 may freely revolve with the shaft 11 and out of engagement with the casing 10. When the speed of the vehicle reaches or exceeds the predetermined speed, the shoes are forced outwardly by centrifugal force so as to frictionally engage with the casing 10 and tend to rotate the latter in the same direction as the shaft. The speed at which the shoes come into operation may be readily controlled by properly selecting the mass of the shoes and the strength and tension of the springs 14. These latter may be provided with any suitable means for adjusting their tension.

The casing 10 is normally held in the position shown, by a spring 16 or any other suitable means tending to rotate the casing in a direction opposite to that at which it rotates or tends to rotate when the shoes 13 are in frictional engagement with it. The rotative movement of the casing in one direction is limited by the engagement of a lug 17 with a stop 18 while movement in the opposite direction is limited by the engagement of a lug 19 with a stop 20. To prevent chattering or rapid movement of the casing in either direction, a dash-pot 21 may be provided with its piston rod 22 connected to the casing in any suitable manner, as, for instance, by direct connection with the lug 19 to which the spring 16 may also be connected.

The rotation of the casing operates to control the speed of the engine which drives the vehicle and also to apply one or more brakes to stop or slow down the vehicle, or prevent it from further increasing its speed. As shown, the engine throttle 24 is connected by a rod 25 to a lug 26 on the casing and the lug 19 is connected by a rod 27 to a bell-crank lever 28 for operating a brake 29. The brake 29 may be either the ordinary foot-brake or the ordinary emergency brake of the vehicle, or may be an additional brake. Preferably, there are two brakes 29 and the brake-drums 30 thereof are directly connected to the rear wheels of the vehicle although there may be but one brake-drum secured to the propeller shaft directly in advance of the differential. I do not claim any novelty in the construction of the brake itself or in the particular location thereof, except that it shall be capable of operation in limiting or retarding the speed of the vehicle rather than the speed of the engine.

Preferably, the connections between the casing, throttle and brake are such that the throttle will be closed before the brake is applied and the throttle may remain in closed position without further movement after being closed and while the casing 10 is rotating further to apply the brake. To permit this, the brake rod 27 has lost motion connections 32 with the lug 19 and the throttle operating rod 25 is formed of two relatively movable sections connected by a spring 33. The spring is such that it prevents relative movement of the two sections until the throttle is closed and thereafter may be compressed to permit a further movement of the lug 26 without further movement of the throttle.

The throttle 24 may, under some circumstances, be the ordinary throttle whereby the driver controls the speed of the car, but preferably the throttle 24 is separate and independent of the usual throttle so that the driver may properly control the speed of the engine in the ordinary way, but can not tamper with or control the action of the throttle 24 when the speed of the car exceeds that for which the herein described apparatus is set.

As the amount of power required to move the casing 10 and close the throttle 24 may be small compared to the amount of power which it is desired to exert in applying the brakes, the friction shoes of the centrifugal device may be made of sections so that when one speed is reached, a comparatively small section will engage with the casing to rotate the latter a sufficient distance to close the throttle and when the speed reaches a second and slightly higher limit, the remainder of the shoe will come into operation and sufficient force will be exerted on the casing to move it a further distance and apply the brakes. As shown, the shoe 13 has a small central section 35 which is relatively movable in respect to the body of the shoe and is normally held against outward radial movement into engagement with the casing 10 by a spring 36. The section 35 may be so mounted in the body of the shoe that it cannot move outwardly in respect to the latter, but will normally project out a short distance. Thus, when the two sections of the shoe move outwardly together, the section 35 will engage with the casing and upon a further increase in centrifugal force, the spring 36 may be compressed and the remainder of the shoe moved outwardly into engagement with the casing. I do not wish to be in any way limited to the specific construction illustrated, as the two shoe sections may be mounted in any other manner commonly employed in centrifugally operated brakes or clutches.

I have illustrated the axes of the throttle, shaft 11 and drum 30 as parallel in order that the relative movements of the parts may be better understood, but of course this arrangement is not important. By the use of bell-crank levers, rock shafts, or cables, the desired movements may be imparted to the throttle and brake upon the predetermined rotative movement of the casing 10 irrespective of the particular positions of the parts. Preferably, the operative connections are so designed or so enclosed that the driver cannot readily render the device inoperative by removing any coupling pin or disconnecting any of the parts.

After the shoes 13 have been moved outwardly by an increase of speed and centrifugal force so that they frictionally engage with the casing or drum 10, any further increase of speed will result in a very material increase in the centrifugal force and the frictional engagement of the shoes with the casing. The surface of the shoes and of the casing may be such that this friction may be very great and I may therefore entirely eliminate the connection between the casing and the brake 29 and may utilize this friction within the device itself as the main braking action of the controller.

I have shown an engine speed regulator in the form of a throttle in the intake pipe, but I do not wish to be limited to this particular means for controlling the engine. The rod 25 might be connected to any other known mechanism for controlling the engine speed such, for instance, as the timer, the fuel supply valve, a back pressure valve in the exhaust, or the like.

In Figure 3, I have illustrated part of a device very similar to that shown in Figure 1 except that the collar or head 40 has four radially disposed guideways for four separate shoes 41, each of which is normally held in the inward position by a separate spring 42. Any other arrangement of brake shoes might be employed. Two of the springs 42 which are diametrically opposite to each other may be weaker than the other two so that one pair of shoes will come into engagement with the casing before the other pair, or the springs may all be made of the same strength and the shoes operate simultaneously.

Instead of mounting the member carrying the centrifugally operated shoes or other devices by a shaft constituting a part of the power connections between the engine and the driving wheels, I may provide a separate shaft to carry these parts and operatively connect it by any form of power transmitting connection to some part of the driven part of the vehicle which rotates at a speed proportional to the speed of the vehicle. This is preferably where I apply my invention to a complete vehicle and the design of the parts of the vehicle are such that the casing 10 and friction shoe carrying part 12 cannot readily be applied to the propeller shaft.

In Figure 4 I have illustrated a construction especially designed for installation on a previously completed vehicle. This construction includes a shaft 50 mounted in bearings on any suitable part of the chassis or in any other supports 51 of the vehicle. The shaft may be connected to and driven by the propeller shaft, jack shaft or any other rotary driven part in the rear of the clutch and transmission gearing. The driving may be by any form of gearing or other power transmitting devices. In the drawing I have shown the shaft provided with a sprocket wheel 52 from which a chain may extend to a corresponding sprocket wheel on a driven part of the vehicle. By varying the sizes of the sprocket wheels, the shaft 50 may be driven at a higher or lower speed, or at the same speed, as the rear wheels of the vehicle.

Mounted on the shaft 50 and rotatable in respect thereto is a sleeve 53 externally threaded and connected to or integral with a casing 54 concentric with the shaft. Within the casing, the shaft has centrifugally actuated shoes for engagement with the casing. These shoes may be of the same construction as those shown in Figure 1 or may be similar to those shown in Figure 3, or may be of any other construction common in centrifugally actuated brakes or clutches. Merely as an example, I have illustrated the shaft as provided with a head 55 rigidly secured thereto and a second head 56 keyed and slidable along the shaft. A spring 57 continually tends to spread the heads apart and pairs of links 58 and 59 connect the two heads to brake shoes 60 adjacent to the inner surface of the casing 54. When the shaft 50 is rotated at a speed below the predetermined and critical speed, the spring 57 holds the heads 55 and 56 a sufficient distance apart so that the shoes 60 do not touch the casing 54. As the speed increases, centrifugal force overcomes the action of the spring 57 and the shoes are caused to move outwardly into engagement with the casing and to press thereagainst with a pressure dependent upon the speed of rotation.

Mounted on the threaded portion of the sleeve 53 is a collar 61 having outwardly extending pins or trunnions 62 engaging in slots in the opposite branches or forks 63 of a lever 64. One end of this lever has lost motion connections 32 with a brake operating rod 27 similar to that shown in Figure 1 and which is operatively connected to the brake 29. The opposite end of the lever 64 is connected to a throttle operating rod 25 which may be connected to a throttle as is in Figure 1.

The casing shown in Figure 1 is capable of rotating through only a part of a revolution, whereas in the construction shown in Figure 4, the casing 54 may be rotated through several revolutions. Thus, in the construction shown in Figure 4, a greater leverage may be secured and greater power may be applied to the brakes with a correspondingly smaller pressure exerted by centrifugal force in the casing.

The lever 64 may be normally held in such a position that the brake is disengaged and for this purpose a spring 65 may be employed. A spring 66 may normally tend to rotate the casing in one direction and thus tend to move the collar 61 along the threaded portion of the sleeve to such a position that the brake is not applied and the throttle is open. Such a spring is shown in Figure 5 and is in the form of a spiral with one end secured to a stationary point and the other end connected to a sleeve.

By pivoting the lever 64 on the collar 61 and by providing a stop 67 in the path of one end of the lever, it is no longer necessary to provide lost motion connections between the lever and the throttle. With the parts in the position shown in Figure 4, an increase in the speed of rotation of the shaft would cause the shoes to engage with the casing and rotate it and move the collar 61 toward the left. The upper end of the lever may remain substantially stationary while the lower end of the lever advances to close the throttle. At the instant the throttle is closed the lever engages with the stop 67 and then if the collar 61 be moved a further distance, the lever will swing about the lower end as a center and its upper end will operate to pull the rod 27 and apply the brakes. The rods themselves may be relied upon to prevent a rotation of the lever 64 and the collar 61 around the shaft 50 as a center or any other suitable guiding or supporting means may be employed. I have shown a slotted connection between the collar and the lever, but this is not essential if the upper and lower ends of the lever be free to rise or fall to a slight extent as the lever swings. I have shown the upper end of the lever supported by the rod 27 and the latter guided in a support 68, but these details are not essential.

Instead of employing the pivoted lever and stop construction of Figure 4, I may employ a type of lost motion connection between the rod 25 and the throttle as is shown in Figure 8. Here a spring 70 normally tends to swing the throttle lever 71 in one direction so as to open the throttle. The rod 25 carries a head 72 presenting a cam surface 73 and a surface 74 substantially parallel to the direction of movement of the rod. With the parts in the position shown in Figure 1, the throttle will be open while upon moving the rod 25 toward the position shown in dotted lines, the lever will be moved to close the throttle. After the end of the lever reaches the lower end of the cam surface 73, the rod 25 may continue to move toward the left without any injury to the throttle or without any tendency to move it past its normal closed position.

In Figure 7 I have shown a further modification of my construction and in which the shaft 80 may correspond to either the shaft 11 of Figure 1 or the shaft 50 of Figure 4. It is illustrated as being rotated from a shaft 81 by a chain drive 82. A casing 83 is concentric with the shaft 80 and with it shoes 84 may engage when the critical speed is reached. The rotation of the casing may operate the brake and the throttle in substantially the same way as is shown in Figure 1. One of the important details of this construction is the single stop 85 with which either the lug 86 or the lug 87 may engage to limit the rotation of the casing. The lug 86 is illustrated as having an inclined surface 88 engaging with a roller 89 on the end of a bell crank lever 90. Beyond the inclined surface 88 is a surface substantially parallel to the periphery of the casing. Thus as the casing rotates through a limited distance, the roller will travel along the cam surface and the bell crank lever will be turned to close the throttle. At the instant the throttle reaches a closed position, the roller reaches the upper end of the cam surface and a further rotation of the casing 83 in applying the brakes will not operate to further affect the throttle.

My invention is particularly designed for use on a motor vehicle of the type in which the motor is operated by internal combustion and in which the speed of the motor is controlled by opening or closing the throttle and by advancing or retarding or otherwise controlling the spark of the ignition system. I may in some cases employ an electric motor or any other suitable prime mover as the means for propelling the vehicle and in such construction the rod 25, which I have shown for operating the throttle, might be employed for operating any other suitable speed regulating device of the motor such as a rheostat for an electric motor or the steam valve for a steam motor.

While I have shown and described my device as operating to throttle the engine before applying the brake, it will be obvious that both actions may be simultaneous. Moreover, my speed controllers are usually designed and adjusted so as to come into operation only at speeds approaching the normal running speed for which the motor is designed, and this, in the case of motor trucks for instance, is say fifteen to twenty miles an hour. At such relatively high speeds the brake is very effective in cutting down tendency to increased speed even though the motor throttle be wide open, and in such cases it is entirely practical to simplify my above described apparatus by omitting or disconnecting the throttle control, the speed being kept down to the required limit solely by means of the brakes.

Having thus described my invention, what I claim as new and desire to secure by Letters Patent is:

1. A speed regulator for motor driven vehicles, including a movable member, resistance means normally tending to prevent its movement in one direction, a driving shaft, means for frictionally connecting said shaft and said member when the speed of the shaft reaches a predetermined limit and tending to move said member against said resistance means, an engine controlling device and reciprocally operating means for actuating it in both directions solely by power derived from the movements of said movable member, braking means and a lost motion connection for actuating it reciprocally in both directions by power derived solely from said movable member whereby movement of said movable member in one direction actuates first said engine controlling device at a predetermined speed limit and then said braking means at a predetermined higher speed, if and when, the speed of the shaft exceeds said first-mentioned predetermined limit and whereby movement of said movable member in the opposite direction releases first said braking means at a predetermined speed and then said engine controlling devices, if and when the speed falls below the speed of release of said braking means..

2. A speed regulator for motor driven vehicles, including a driving shaft, an oscillatory member concentric therewith, resistance means normally tending to prevent rotation of said member in one direction, centrifugally operated frictional means connected to said shaft having separately movable frictional surfaces of different areas, the smaller surface area being adapted to engage with said member at a predetermined speed and the larger frictional area at a predetermined higher speed to rotate said member against the action of said resistance means and with continually increasing effect as the speed of the shaft increases, a brake, and means for positively actuating said brake by power directly applied by movement of said member by said frictional means.

3. A speed regulator for motor driven vehicles, including a driving shaft, an oscillatory member concentric therewith, resistance means normally tending to prevent rotation of said member in one direction, centrifugally operated frictional means connected to said shaft and adapted to engage with said member and tend to rotate said member against the action of said resistance means and with continually increasing effect as the speed of the shaft increases, an engine controlling device, and means including a lost motion connection for directly actuating said device by the power of movement of said member by said frictional means.

Signed at Greenwich, in the county of Fairfield and State of Connecticut, this 28th day of January, A. D. 1916.

ALDEN L. McMURTRY.

Witnesses:
A. W. W. MARSHALL,
GEORGE A. FINN.